United States Patent Office 3,365,498
Patented Jan. 23, 1968

3,365,498
REDOX CATALYTIC OXIDATION OF OLEFINS
TO ALDEHYDES AND KETONES
David R. Bryant, South Charleston, and James E.
McKeon and Paul S. Starcher, Charleston, W. Va.,
assignors to Union Carbide Corporation, a corporation of New York
No Drawing. Filed Apr. 15, 1963, Ser. No. 272,877
12 Claims. (Cl. 260—586)

This invention relates to the preparation of carbonyl compounds such as aldehydes and ketones by oxidation of olefins in a redox system. More particularly, this process relates to the manufacture of aldehydes and ketones by redox oxidation of olefins in the essential absence of halide ions and in the absence of strong acids, particularly strong mineral acids, such as halogen acids.

There is described in British patent specification 898,790, published June 19, 1962, a process for the production of aldehydes and ketones from olefins by redox catalysis in a strong mineral acid system. It is fairly indicated that hydrohalic acids, particularly hydrochloric acid, are the preferred mineral acids in the operation of the patentee's process. The patent is most specifically directed to the use of the soluble chlorides of palladium as the catalyst and chlorides of copper as the oxidant therefor. Cupric chloride serves the function of oxidizing the palladium catalyst from the Pd(O) state to the Pd(II) state (i.e., $PdCl_2$), a condition necessary for complexing the olefin with palladium. In the presence of an oxygenating agent, the Pd(II) olefin complex forms the aldehyde or ketone.

The patentee's selection of hydrohalic acid, particularly hydrochloric acid, over other mineral acids is obvious. Palladium and copper are employed as $PdCl_2$ and $CuCl_2$ in the British patent. Cupric chloride is readily soluble in the water or solvent employed in said patent and cuprous chloride is not, typically precipitates from the system or disproportionates to Cu metal and cupric chloride. As a result a large amount of hydrochloric acid is necessary in order to solubilize and stabilize Cu(I) by converting cuprous chloride to complex species such as $CuCl_2^-$. Copper salts from strong mineral acids other than hydrohalic are typically undesirable because of their relative instability in the Cu(I) state. Moreover, mineral acids such as nitric acid, sulfuric acid and perchloric acid, are undesirable because of their tendency to cause side reaction with the olefin and aldehyde or ketone products. Therefore, the chloride salt is particularly useful and obviously the only practical salt form described in this patent for making aldehydes and ketones.

The British patentee's process results in very objectionable difficulties as a consequence of the presence of hydrohalic acid and cupric halide or other transition metal halides in the system. It is mandatory to employ extremely expensive corrosion resistant material, such as titanium, in the construction of the apparatus in which the reaction is effected and in which the components of the process come into contact. Moreover, the presence of copper halides in the reaction medium causes the formation of halogenated by-products which are difficult to separate from the system and the desired product. Copper halides will be formed regardless of the manner halogen is provided in the reaction medium.

In a specific case, during the production of acetaldehyde, halogen in the system results in the formation of volatile halogenated product, e.g., dichloroethylene, methyl chloride, chloroform, mono-, di-, and tri-chloroacetic acid. The presence of such compounds in the product streams requires that the apparatus which these compounds come into contact be made of corrosion resistant material. Moreover, many of these halogenated contaminants remain in the product even after refining and make the acetaldehyde undesirable for a variety of its usual industrial applications, e.g., reduction to ethanol, aldol condensation, production of ethyl acetate, etc. Some of the less volatile halogenated products are converted to oxalic acid during processing, which tends to remove both the catalyst metal and co-oxidant metal as insoluble oxalates from the reaction. This serves to shorten the catalyst and co-oxidant life. Any halogen present in the system, whether added as a neutral salt or not, will tend to cause the aforementioned difficulties. This represents an unnecessary expense in the production of aldehydes and ketones.

There has now been found a method of producing aldehydes and ketones by redox oxidation of olefins which distinctly minimizes the aforementioned difficulties.

It is disclosed herein a process for production of aldehydes and ketones by oxidation of olefins in a redox system which avoids the use of strong mineral acids, particularly hydrochloric acid, and the presence of halide ion, yet gives commercially attractive yields and rates of aldehyde and ketone production. The process of this invention may be effected in inexpensive substantially noncorrosion resistant materials and with total avoidance of halogenated by-products such as chlorinated hydrocarbons.

The process of this invention involves contacting an olefinic compound with a catalyst which is a reducible metal compound capable of possessing an oxidation state while complexed with the olefinic compound, the "catalytic" state. There is provided with the catalyst a metal co-oxidant in the higher of at least two potential oxidized states, which can occur upon reaction of a reduced form of the co-oxidant with an oxidizing agent, and in which state is capable of oxidizing the metal of the catalyst to the catalytic oxidation state. The co-oxidant is repeatedly regenerated by contact with an oxidizing agent capable of converting said co-oxidant to said higher oxidized state prior to or during reaction when formation of the carbonyl compound occurs. The process of this invention is effected in the essential absence, significantly in the total absence of strong mineral acids and other strong acids which have an ionization constant greater than $5 \times 10^{-3}$ in water at 25° C.

It is significant to note that the process of this invention is not sensitive to the presence of halide ions, insofar as the over-all function of the process in producing aldehyde and ketone is not altered. On the other hand, the presence of appreciable halide ion concentration causes the difficulties described above. For this reason, the reaction mixture must be essentially free of halide ion, i.e., the halide ion concentration should be less than 50 parts per million, preferably below 25 parts per million, basic weight of the reaction mixture.

Moreover, the process of this invention does not preclude the presence of substantial amounts of anions of strong mineral acids other than hydrohalic acids so long as they are present as neutral salts, such as sodium sulfate, sodium nitrate and the like.

The catalyst of the process of this invention is a metal typically in oxidized form which is either a complex with a non-olefinic compound or is a salt of a weak acid such as an acid having an ionization constant not greater than $5 \times 10^{-3}$, determined in water at 25° C. The acid may be inorganic such as sodium dihydrogen phosphate, disodium hydrogen phosphate, and other alkali metal salts of hydrogen phosphates, arsenous acid, sodium dihydrogen arsenate, and the like. Desirably, the salt is from an organic carboxylic acid such as the following mono-carboxylic acids: saturated fatty acids of up to 18 carbon atoms, e.g., formic acid, acetic acid, n-propionic acid, n-butanoic acid, n-pentanoic acid, 2-ethylhexanoic acid, 2- carboxybutane and the like; the cycloalkylcarboxylic acids such as cyclohexylcarboxylic acid, cyclopentylcarboxylic acid, and the like; and the aromatic containing carboxylic acids, such as benzoic acid, naphthoic acid, phenylacetic acid, and the like. The carboxylic acid should be free of non-benzenoid carbon to carbon unsaturation. Alkanoic acids of from 1 to 10 carbon atoms and cycloalkyl acids of 5 to 6 carbon atoms in the ring are preferred. Significantly desirable are the saturated fatty acids of from 1 to 4 carbon atoms, such as formic, acetic, propionic, and butyric acids, with acetic acid the most desirable of the class.

The catalyst may also be utilized in the oxidation state as a coordinate complex, i.e., the metal is complexed with one of a plurality of ligands, such as β-dicarbonyl ketones and esters, e.g., malonic acid esters, acetylacetone, and methylacetoacetate; β-ketonitriles, e.g., acetoacetonitrile; and the like complexing agents. The complexing agents are preferably organic and typically possess ionization constants appreciably lower than that of the weak acids.

The catalyst of this invention is an oxidized metal in association with complexing agents or anions of weak acids which is capable of inducing formation of an aldehyde or ketone in the presence of water and an olefin herein described. For example, the oxidized metal when associated with the complexing agent or anion of the weak acids and admixed with a solvent, water and the olefins herein described, at the temperatures contemplated herein, should be capable of producing an aldehyde or ketone, and the selection of an oxidized metal compound operable in the instant process may be determined by a specific test such as that which follows.

For example, to a 300 milliliter glass bomb liner equipped with a 24/40 standard tapered joint and a gas vent were charged 45 grams of acetic acid, 5 grams of distilled water and 2.24 grams of palladium (II) acetate. The liner with its contents was sealed in a steel high pressure bomb and both were purged with nitrogen. The contents were heated with rocking to 100° C., and ethylene was charged to the contents at 500 pounds per square inch gauge. Heating and rocking were continued for one hour, after which the bomb was cooled and vented. The reaction mixture in the liner contained 0.375 gram of acetaldehyde corresponding to a yield of 85 percent. Thus palladium may be employed in the catalyst of the present invention.

Particularly desirable metals which may be employed in the catalyst of this invention are the precious metals of the transition series. This includes palladium, platinum, iridium, rhodium, ruthenium, osmium and gold. Palladium because of relatively low cost and other reasons is particularly preferred.

It is, of course, to be appreciated that any selected metal in the performance of the catalyst is dependent upon the chosen ligand, if complexed, or the selected anion, when employed in salt form. Moreover, other process variables govern the performance level of the catalyst, such as, the olefin to be oxidized, solvents, water concentration, temperature, and the like. Thus, each metal may require a favorable environment for its use in the present invention.

In view of the preference for palladium, the remaining discussion of this invention is specific to its use as a salt or complex. It is to be understood that other metals within the above standards may be substituted for palladium and utilized in accordance with the discussion herein.

The co-oxidant in this invention in conjunction with the catalyst forms the redox system for conversion of olefin to aldehyde or ketone. The co-oxidant is typically the salt or complex form of a metal which possesses at least two oxidized states, the higher of which occurs upon reaction with an oxidizing agent, from which it may be reduced when acting as an oxidant for the reduced catalyst.

The metal co-oxidant, as stated previously, is typically in the form of a salt or complex, preferably as a salt of the aforementioned weak acids, to wit, an acid having an ionization constant of not greater than $5 \times 10^{-3}$, or as a complex of the aforementioned complexing agents listed for the catalyst. Suitable metals for use as a co-oxidant include transition metals, e.g., Groups VI–B, VII–B, VIII and I–B of the Periodic Chart of Elements, Second Cover, Merck Index, Sixth edition. The most significantly desirable of the co-oxidants are copper salts of the aforementitoned weak acids. Other metals which may be substituted include Fe, Cr, Co, Ni, Mo, W, Mn, Pb, and the like. Members of the lanthanide series such as cerium or mixtures of the lanthanides are also potentially useful for employment as the co-oxidant component. The use of a mixture of two or more of such metals as, e.g., a couple of Cu and Pb, may also be of value in obtaining the correct range of oxidizing potentials and also to increase the total concentration of co-oxidant in the process.

Much preferred is the use of the aforementioned copper salts or complexes particularly because of their significant solubility whether in cupric or cuprous state. Because of this the following discussion will be specific to the use of copper as the co-oxidant in conjunction with palladium as the metal of the catalyst component. It is to be understood that the other metals discussed above may be employed as the co-oxidant component in the process of this invention.

The olefinic compounds contemplated as reagents in this process contain at least one ethylenic group, i.e., $>C=C<$, and are free from acetylenic unsaturation. They also contain at least one free hydrogen atom on each carbon atom of at least one ethylenic group therein. Olefinic compounds desirable in this process may be characterized by the following formula:

(I) $$RHC=CHR$$

wherein each R can be either hydrogen or a monovalent hydrocarbon radical free of acetylenic unsaturation, e.g., alkyl, cycloalkyl, alkenyl, cycloalkenyl, aryl, aralkyl, alkaryl, and the like. In addition, both R's together with the ethylenic carbon atoms of Formula I, supra, may represent a cycloaliphatic hydrocarbon nucleus containing from 5 to 12 carbon atoms, preferably from 5 to 8 carbon atoms. Illustrative are cyclopentene, cyclohexene, cycloheptene, cyclooctene, cyclododecene, their alkyl and aryl derivatives and the like.

Illustrations of R include hydrogen, methyl, ethyl, n-propyl, isopropyl, n-butyl, isobutyl, sec-butyl, the pentyls, the hexyls, the heptyls, the octyls, the dodecyls, the octadecyls, vinyl, allyl, 1-propenyl, 1-butenyl, 2-butenyl, 3-butenyl, the hexenyls, the octenyls, the cyclopentyl, cyclohexyl, cycloheptyl, cyclohexenyl, phenyl, tolyl, xylyl, ethylphenyl, propylphenyl, benzyl, phenethyl, phenylpropyl, phenylbutyl, and the like. Illustrative olefinic compounds include ethylene, propylene, 1-butene, 2-butene, 1-pentene, 2-pentene, 1-hexene, 2-hexene, 3-hexene, 1-heptene, 2-heptene, 3-heptene, the octenes, the decenes, the dodecenes, the octadecenes, cyclopentene, cyclohexene, cycloheptene, cyclooctene, cyclododecene, lower alkyl (1 to 4 carbon atoms) substituted cyclopentene, lower alkyl (1 to 4 carbon atoms) substituted cyclohexene, lower alkyl (1 to 4 carbon atoms) substituted cycloheptene, butadiene, 1,3-pentadiene, isoprene, 1,3-hexadiene, 1,5-hexadiene, the heptadienes, 1,7-octadiene, the dodecadienes, 4-vinylcyclohexene, vinylcyclohexane, allylcyclohexane, vinylcyclopentane, styrene, 3-phenylpropene-1,4-phenylbutene-1, bicyclo[4.3.0]nona-3,7-diene, the methyl substituted styrenes, the ethyl substituted styrenes, and the like.

Preferred olefinic compounds include the alkenes expecially those which have from 2 to 8 carbon atoms; the alkadienes especially those which have from 4 to 8 carbon atoms; the cycloalkenes especially those which have from 5 to 6 carbon atoms in the cycloalkenyl nucleus; the vinylcycloalkanes especially those which have from 5 to 6 carbon atoms in the cycloalkyl nucleus; the α-alkenylbenzenes especially those which have from 2 to 4 carbon atoms in the α-alkenyl moiety thereof; and the like. Highly preferred olefinic compounds include ethylene, propylene, 1-butene, butadiene, isoprene, cyclohexene, 4-vinylcyclohexene, and styrene. Ethylene is most preferred.

The oxidizing agent employable in this process may be oxygen, per se, or in admixture with other gases such as in the case of air. The oxidizing agent may also be a compound capable of releasing oxygen in the oxidation and reduction reaction, such as the peroxides, e.g., peracetic acid, hydrogen peroxide, oxides of nitrogen, and the like. The oxidizing agent is thought to serve the function of reoxidizing copper to its higher oxidized state, i.e., cupric; and thus the amount of oxygen in the process should be sufficient to effect this result.

The process of this invention simply involves mixing all the aforementioned ingredients in a reaction zone suitable for the incorporation of all of them. It is not mandatory to incorporate the oxidizing agent in the zone where conversion of the olefin to aldehyde or ketone is effected. Thus, the reaction zone should contain as important ingredients, the olefin, the catalyst and the co-oxidant.

The reaction resulting in the production of aldehydes or ketones may be conducted over wide temperature and pressure ranges. The selection of the pressure and temperature for optimum results will depend upon various factors such as the nature of the olefinic reagent, catalyst and oxidant, the concentration of the components in the reaction, the use of solvents and/or diluents, the equipment employed, and the like.

The reaction temperature typically ranges between 0° C. and 250° C., though lower and higher temperatures may be found suitable. A particularly suitable temperature range is from about 20° C. to about 200° C. In general, the reaction proceeds more favorably at elevated temperatures. A reaction temperature in the range of from about 50° C. to about 160° C. is preferred. It has been observed that significant results are obtained at 80° C. to 130° C.

When the olefin is normally gaseous, it is desirable to operate the process at super atmospheric pressures. On the other hand, when the treated olefin is liquid at operating temperatures then pressures less than atmospheric may be employed. In general, wide pressure ranges are within the purview of this invention. It is desirable to employ a total pressure which is at least 1 atmosphere. In many instances, it is preferred to utilize a total pressure slightly greater than 1 atmosphere up to 300 atmospheres and higher. A total pressure of about 10 to 100 atmospheres is highly preferred when gaseous olefins are employed.

The reaction may be effected for a period of time ranging from seconds to several hours depending upon the correlation of factors embodying the operation of this process. For example, the reaction can be completed in less than 1 second or up to 10 hours or longer.

The carbonylization reaction by which an olefin carbon atom is converted to carbonyl, can be effected in the vapor phase or liquid phase over a fixed catalyst bed or, alternatively, it can be conducted as a homogeneous liquid phase reaction. The homogeneous liquid phase reaction is preferred.

The preferred operation of this invention, as indicated above, is carried out in a homogeneous liquid phase. This requires the presence of a liquid substance, such as a solvent, at the temperature of operation during the process. A most convenient liquid which may be utilized as a solvent includes the saturated aliphatic monocarboxylic acids having a melting point less than 150° C. and a boiling point typically not greater than 250° C., determined at atmospheric pressure. The carboxylic acid should be liquid at the temperature at which the reaction is effected.

Illustrative monocarboxylic acids are those disclosed above useable for salt formation of the catalyst and co-oxidant. Another class of liquids which may be utilized as a solvent or as a diluent in conjunction with the aforementioned carboxylic acids is an inert normally-liquid organic vehicle such as hydrocarbon nitrile, e.g., acetonitrile, propionitrile, benzonitrile, and the like; the dialkyl sulfoxides, e.g., dimethyl sulfoxide, and the like; the cyclic sulfoxides, e.g., tetrahydrothiophene-1-oxide, and the like; the dialkyl sulfones, e.g., dimethyl sulfone, and the like; the N,N-dialkylcarboxamides, e.g., N,N-dimethylacetamide, N,N-dimethylformamide, and the like; the cyclic sulfones, e.g., sulfolane, and the like; the dialkyl and cyclic carbonates, e.g., diethyl carbonate, ethylene carbonate, and the like; the aliphatic and cyclic ethers, e.g., tetrahydrofuran, dioxane, dimethyl ether of diethylene glycol, dimethyl ether of triethylene glycol, and the like; beta-diketones, e.g., 2,4-pentanedione; beta-ketoesters, e.g., acetoacetic acid esters (e.g., methyl ester) and malonic acid esters (dimethyl malonate); ketodioxane and the like.

An essential feature of this invention involves the incorporation into the reaction of specific quantities of water. It has been found that in order to effect reasonable production of aldehydes or ketones, it is essential to provide water in the reaction in an amount of from 2 to 20 percent by weight, basis weight of the liquid components in the reaction mixture. If the process is effected in a gas phase, then water should be present in amounts of from 2 to 20 percent by weight, basis weight of the gases in the reaction zone. The water should be essentially free of impurities and de-ionized or distilled water is preferred. When the liquid phase reaction is effected, a desirable water content is from 3 to 18 percent by weight of the total weight of the liquid components of the reaction. When the water concentration is in the 3 to 10 percent range, the aldehyde or ketone product is obtained in substantially optimum yields.

Another essential feature of the present invention is to provide a detectable amount of titratable base in the reaction mixture. Such a base is determined by titrating the reaction mixture with a solution consisting of a measurable amount of perchloric acid in acetic acid. The titratable base may be the co-oxidant salt or complex, catalyst salt or complex, or another basic salt added for this purpose. Generally, the titratable base may be present in trace amounts up to saturation of the reaction mixture. Amounts of base in excess of saturation may be also employed.

The function of the titratable base is not wholly appreciated. It has been noted that the ease of operation of the present process is greatly enhanced with the presence of some titratable base.

It has been found desirable to provide as the titratable base in the reaction mixture, a basic salt of the aforementioned carboxylic acids. This salt may be added per se or formed in situ in the reaction by addition of a basic compound capable of forming the salt. It is important that the salt or the basic compound which forms the salt does not interfere with the carbonylization reaction, or if the salt does interfere it is capable of being readily removed from the reaction medium. A basic salt of a strong base capable of forming a solid monocarboxylate salt in water and/or the solvents, such as the carboxylic acid and inert normally-liquid solvents, is preferred. Illustrative salts include metal carboxylates wherein the metal is an alkali metal such as sodium, potassium, and the like; an alkaline earth metal such as magnesium, calcium, barium, and the like; transition metals, such as lead, tin, zinc, cadmium, iron, zirconium, titanium, and the like. Preferably, the cation of the salt of the monocarboxylic acids is an alkali metal which forms carboxylates such as sodium acetate, potassium acetate, lithium acetate, potassium propionate, sodium propionate, and the like; the Group II metal carboxylates, such as barium acetate, zinc acetate, magnesium acetate, cadmium acetate, zinc propionate, and the like; various other transition metal monocarboxylates such as cobalt acetate, nickel acetate, manganous acetate, and the like.

The amount of the above basic salts including the alkali metal, the alkaline earth metal, transition metal salts, etc., is variable. The salts may be employed in trace amounts up to 50 percent by weight of the reaction mixture, or more, e.g., up to full saturation of the salt in the solution. Even higher concentrations of the salts are contemplated. Concentration far in excess of saturation, e.g., a slurry of the salt may be employed.

It has been surprisingly found that the presence of ammonium, quaternary ammonium and amine salts of the aforementioned carboxylic acids favor the production of aldehydes and ketones. Illustrative salts of this class include carboxylic acid salts of ammonia and organo substituted ammonia. Illustrative of these salts are ammonium formate, ammonium acetate, ammonium propionate, and other ammonium salts of the carboxylic acids described previously. It has been found that amounts in the range of from about 0.001 to 50 percent by weight of these salts, basis weight of total reaction mixture, may be used. Preferably, the amount employed is from 2 to 20 percent by weight, basis weight of reaction mixture.

On the other hand, the process may be carried out in the total absence of the aforementioned salts as additional additives to the catalyst and co-oxidant salts necessarily present, so long as a titratable base is present in the reaction mixture. It is to be noted that, as stated previously, the catalyst and co-oxidant salts, e.g., palladium diacetate and cupric acetate, may serve as the titratable base.

The catalyst, for example, the complexes or salts of palladium in the Pd(II) oxidized state, is present in amounts sufficient to catalytically induce the reaction. When the process is effected in the homogeneous liquid phase, a suitable catalyst concentration may be within a range of from about $1 \times 10^{-6}$ weight percent, and lower, to about 5 weight percent and higher, calculated as palladium, per se, based on the total weight of liquids employed in the reaction. A preferred catalyst concentration is in the order of about 0.00001 to about 1.5 weight percent of the catalyst calculated as Pd(II). The character of the reagents, the operative conditions under which the reaction is conducted, the solvent characteristics, and other factors will significantly determine the catalyst concentration necessary for optimum results. The source of the catalyst, i.e., whether the catalyst is best useable in salt or complex form is determined on whether the compound is readily soluble in the reaction medium or can become soluble therein by reaction with one of the compenents of the medium. Thus, the catalyst may be a compound of palladium other than the salt or complex form which upon incorporation into the medium forms the desired salt or complex.

The operative state for palladium for effecting the reaction is the Pd(II) oxidation state. The aforementioned salts or complex forms employable in the case of palladium (II) include palladous acylates of the aforementioned monocarboxylic acids, e.g., palladous formate, palladous acetate, palladous propionate, palladous butyrate, palladous hexanoate, palladous cyclohexanecarboxylate and the like, coordinate complexes of palladium with ligands such as described above and illustrated by Pd(II) acetylacetonate, Pd(II) dimethyl malonate and the like. In addition, palladium metal which can be oxidized by a suitable co-oxidant in the reaction medium to Pd(II), and thus form either a salt or a complex product by virtue of the presence in the solution of carboxylic acid anions or the complexing agents, may be employed.

The reaction is typically effected in the presence of sufficient oxygen to essentially prevent the deposition of metal which results from the reduction of the catalytic cation, for example, to essentially prevent the deposition of Pd(O) resulting from the reduction of Pd(II). In other words, the reaction is conducted with sufficient oxygen incorporated therein to maintain the ratio of the co-oxidant in its higher oxidation state relative to its lower oxidation state, e.g., Cu(II)/Cu(I), at a level such that the Cu(II)/Cu(I) couple is capable of converting Pd(O) to Pd(II) at a rate which maintains a catalytically sufficient concentration of Pd(II) and which essentially prevents appreciable deposition of Pd(O).

The determination of sufficient oxygen is readily ascertainable by a routine periodic analysis of samples of the reaction product mixture for Pd(O) and/or Cu(II). As a practical matter, the concentration of oxygen is a function of the operative temperature and the like, particularly in the case when $O_2$ is fed to the reaction. On the other hand, when a compound is employed which releases elemental oxygen, such as a peroxide, temperature becomes the critical factor. Of course, factors such as residence time, the equipment used, safety factors to be observed and the like may impose practical considerations which determine the optimum conditions. For example, should ethylene be the olefinic reagent, caution should be exercised in recovery of the unreacted ethylene to avoid buildup to a potentially explosive oxygen-ethylene mixture.

This latter feature invokes need for careful operation since it is significantly desirable to use an oxygen-rich gas in effecting the reaction. For obvious economic and commercial reasons, a substantially pure oxygen feed, e.g., a gas containing at least 90 volume percent oxygen, is preferred. The introduction of substantially pure oxygen (e.g., at least 99 percent by volume pure) into the system significantly insures a more intimate contact with the reactants in a gas phase reaction, when employed. Thus, as stated previously, the oxygen may be utilized as pure molecular oxygen ($O_2$), oxygen in admixture with inert gases such as in the case of air, and oxygen derived by the decomposition of organic and inorganic compounds, such as in the case of peroxides such as peracetic acid and oxides of nitrogen such as $N_2O_4$.

The concentration of the co-oxidant in the reaction is variable over a wide range. For example, the molar ratio of Cu(II) to Pd(II) can vary from about 0.5 and upwards to several thousand or more. It is desirable to employ a molar ratio of Cu(II) to Pd(II) of greater than one and preferably significantly greater than 1, e.g., greater than 10 and upwards to 60,000 and higher. Of course, the maximum concentration of Cu(II) relative to Pd(II) is dependent upon the operating conditions though it is to be appreciated that the instant invention finds favor in a high molar ratio of Cu(II) to Pd(II).

For practical and optimum results it is highly desirable to achieve the maximum solubility of Cu(II) either as a salt or complex form in the homogeneous liquid phase employed. It is desirable to exceed the normal maximum solubility of Cu(II) whereby to provide a larger Cu(II) salt or complex reservoir. The source of the copper oxidant in Cu(II) oxidized state is readily obtained from the cupric acylate where the acyl moiety is the anion of the carboxylic acids described above or the complex cupric compound where the complexing agents are the ligands described above. Reference is thus made to the aforementioned carboxylic acids and ligands, as the anion to which the cupric cation is chemically associated for use as a co-oxidant in the process of this invention.

The particular selection of the co-oxidant whether in salt or complex form is dependent upon the solubility in the reaction mixture when a homogeneous liquid phase is employed or its adaptability in the reaction when a gas phase reaction is effected. Of course, copper compounds which are capable of converting to the aforementioned salts of complexes may be employed. Illustrative of these is cupric oxide which in the reaction medium converts to the salt or complex form. A minimum amount of experimentation will determine the exact reactants desirable under the conditions of operation particularly if recourse is made to the teachings herein.

The concentration of the aforementioned olefinic compound depends to a substantial extent upon many variables. For example, in the case of a homogeneous liquid phase reaction, the solubility of the olefinic compound in the liquid is dependent upon its character, i.e., whether it is a liquid or gaseous compound at operating temperatures. Of course, a liquid compound is easily incorporated in the liquid phase and the extent of incorporation is dependent upon the solvent employed, e.g., whether the solvent is a carboxylic acid or an inert liquid organic compound. In the case where the olefin is gaseous at operating conditions the solubility of the olefin under operative conditions of the reaction is proportional to the pressure, or differently expressed, the partial pressure of the olefin above the liquid reaction mixture will directly effect the amount of olefins incorporated in the reaction mixture and hence the amount of aldehyde or ketone product obtainable.

In general, amounts of the olefinic compound at least sufficient to maintain substantially all of the Pd(II) in the form of a pi-complex is desirable, though lesser amounts of the olefin may be employed with the consequent disadvantage of lower reaction rates and reduced amounts of aldehyde and ketone products. Usually there is employed at least one mole of olefin in the reaction mixture for each mole of palladium therein. The practical upper limit of the concentration of olefinic compound is that which measurably decreases the solubility of inorganic components, e.g., the oxidant of the reaction mixture.

When a homogeneous liquid phase reaction is employed using the aforementioned components in a solvent medium, the solvent employed should be sufficient to maintain reasonable dissolution of the Pd(II) and Cu(II) components in amounts sufficient to give desired yields.

This process can be effected in a batch, semi-continuous or continuous manner. Equipment can be fabricated of glass, metals such as stainless steel, nickel, alloys thereof and other conventionally employed materials to best suit the particular needs of the contemplated operative conditions.

One suitable manner for effecting the carbonylization reaction is to first prepare a liquid mixture of co-oxidant, e.g., Cu(II), water in the specified amount, solvent, and catalyst, e.g., Pd(II). Under the desired operative conditions of temperature and pressure, the olefinic compound, e.g., ethylene, and oxygen can be introduced as an admixture, separately but simultaneously, or separately in stages into the homogeneous liquid phase reaction medium. The aldehyde or ketone (in the case of ethylene, acetaldehyde is formed) and water can be continuously removed from the reaction zone and the product is recoverable by conventional procedures well known to the art. Water removal is effected in amounts sufficient to avoid excess buildup of water.

The reaction may also be effected utilizing the inert, normally-liquid organic solvents described above. These organic solvents are typically polar compounds which are capable of enhancing the solubility of the metal salts or complexes in the homogeneous liquid reaction mixture, particularly in the case of the Cu(II) salt or complex. These solvents are inert with respect to the reagents and products produced. In view of their ability to enhance solubility of the redox agents, the reaction rates are favorably increased.

The process of this invention is adaptable to many procedures for commercial utilization and one which is preferred involves a two-step operation. The first step is the one in which the reaction is effected. The second step is the one in which the copper (I) component is re-oxidized prior to re-introduction into the reaction. This two-step process is essentially a cyclic process involving the continuous production of aldehyde and ketone and the continuous regeneration of the co-oxidant outside of the reaction zone. In the reaction step, the olefinic compound is contacted with the catalyst and the co-oxidant in the presence of water under the conditions noted previously to produce the aldehyde or ketone, depending upon the olefinic compound employed. It is desirable to first prepare a homogeneous liquid phase containing the solvent, the water, the catalyst and the oxidant and then contacting this homogeneous liquid phase with the olefinic compound. Thereafter, the aldehyde or ketone product, as well as unreacted olefinic compound, if present, are recovered from the reaction product mixture via conventional techniques, e.g., distillation under reduced pressure. The remainder or residue which typically contains some co-oxidant in the lower oxidation state, e.g., Cu(I), is contacted with sufficient oxygen to regenerate the co-oxidant from Cu(I) to Cu(II), i.e., from a lower state of oxidation to a higher state of oxidation. Purging of excessive amounts of ingredients may be effected by distillation or by withdrawing a side stream of the regenerated mixture. Make-up reagents may be added at this time to the mixture. The regenerated mixture is then recycled to the reaction step. It may be found necessary to provide additional salt forming agents or complexing agents to the reaction medium or to the regenerated mixture prior to the reaction step. Another liquid organic solvent, such as described previously, may be employed during the reaction step and/or regeneration step as is found necessary.

Moreover, the process may be effected in an essential vapor or gas phase operation. For example, the co-oxidant, such as Cu(II) either as a salt or complex, may be coated with the catalyst, such as Pd(II) in salt or complex form, on an inert particle base (such as silica) thereby to form a particulate catalyst mass. Desirably, the coated particles are of a size suitable for fluidization. Their size may range from 1 micron to 1,000 microns. A bed of these particles may then be placed in a fluidizer, such as a cylindrical shaft furnace having a porous base plate. The bed of particles may be brought to and maintained in a dynamic state characterized as the fluidized state by feeding through the base plate gaseous olefin and/or oxygen with or without water vapor in the amounts indicated above for such an operation. The fluidizing rates or velocity rates of the gaseous components to the bed depends upon a plurality of factors well known in the fluidizing art and such are applicable here. It is preferred that the fluid bed reaction be effected with as much available catalyst surface as is possible and therefore the redox catalyst particles in the bed preferably range between 20 to 200 microns in size. The gas velocity should be sufficient to effect a bed in dynamic state typically in a fluidized state, yet not sufficient to blow-over an excess amount of those particles that fall in the preferred range. The residence time of the reaction components is determined by the temperature employed and the gas velocity. In addition, the olefin gas velocity should exceed its oxygen flame velocity when the temperature in the reactor is high enough for combustion.

The process may also be effected in a countercurrent homogeneous liquid phase operation. In this type of operation the solvent containing water, catalyst and co-oxidant may be fed to the top of a column and the olefin may be fed to the bottom of the column. The catalyst may be regenerated at any one of the stages of the column by feeding oxygen with the olefin or it may be regenerated outside of the column. To increase contact between the reactants, the components within the column may be agitated. This may be effected through use of a rotating disc column (RDC).

The following examples serve to illustrate specific embodiments to which the present invention is not limited.

Example I

A 0.3-liter cylindrical glass bomb liner equipped with a 24/40 standard taper cap and a gas inlet aperture is charged with 3.63 grams of anhydrous cupric acetate 6.17 grams of ammonium acetate, 0.305 gram of palladium acetylacetonate, 49 grams of glacial acetic acid and 1 gram of water. The glass bomb liner and its contents are inserted into a high pressure cylindrical steel bomb equipped with gas inlet and outlet conduits and a thermocouple port. The bomb and glass liner is then purged with nitrogen and heated with agitation to 100° C. under nitrogen atmosphere. Ethylene is charged into the bomb to 150 pounds per square inch gauge (p.s.i.g.), and heating and rocking of the bomb is continued for 1 hour. The bomb is then cooled below 35° C. and vented to atmospheric pressure. The bomb liner is removed, and the resulting reaction product is analyzed. It is found that 64 percent of the theoretical amount of ethylene has been converted to acetaldehyde in a single pass as determined by vapor phase chromatography. The bomb liner containing the reduced reaction product mixture including some metallic palladium therein is again inserted into the steel bomb, charged with air to 100 p.s.i.g., and rocked with agitation for 0.5 hour at 100° C. The cuprous salt is converted to cupric salt, and no Pd(O) is apparent in the resulting product mixture. There is no appreciable loss of product during this regeneration step. Consequently, the reaction product mixture is recharged with ethylene to 150 p.s.i.g. at 100° C. to give a substantially increased yield of acetaldehyde.

Example II

A 3-liter cylindrical glass bomb liner equipped with a thermowell, a 55/50 standard taper cap, and a small aperture for gas inlet, is charged with 36.32 grams of anhydrous cupric acetate, 15.42 grams of ammonium acetate, 2.24 grams of paladium diacetate, 400 grams of glacial acetic acid and 100 grams of water. The glass bomb liner and its contents are inserted into a high pressure cylindrical steel bomb equipped with gas inlet and outlet conduits and a thermocouple port. The bomb and glass liner is then purged with nitrogen and heated to 110° C. under a nitrogen atmosphere with agitation. Ethylene is charged into the bomb to 150 p.s.i.g.; heating and rocking of the bomb is continued for 1 hour. The bomb is then cooled to below 35° C. and vented to atmospheric pressure. The bomb liner is removed, and the resulting reaction product mixture is analyzed. It is found that 60 percent of the theoretical amount of ethylene has been converted to acetaldehyde in a single pass, through analysis by vapor phase chromatography. The bomb liner containing the reduced reaction product mixture including some metallic palladium therein is again inserted into the steel bomb, charged with air to 100 p.s.i.g., with agitation, for 0.5 hour at 100° C. The cuprous salt is converted to cupric ion, and no Pd(O) is apparent in the resulting reaction product mixture. There is no appreciable loss of product during this regeneration step. Consequently, the reaction product mixture is recharged with ethylene to 150 p.s.i.g. at 100° C. to give a substantially increased yield of acetaldehyde.

Example III

A 3-liter cylindrical glass bomb liner equipped with a thermowell, a 55/50 standard taper cap, and a small aperture for gas inlet is charged with 36.32 grams of anhydrous cupric acetate, 15.42 grams of ammonium acetate, 2.24 grams of palladium diacetate, 500 grams of glacial acetic acid and 26.3 grams of water. The glass bomb liner and its contents are inserted into a high pressure cylindrical steel bomb equipped with gas inlet and outlet conduits and a thermocouple port. The bomb and glass liner is then purged with nitrogen and heated to 148° C., with agitation, under a nitrogen atmosphere. Ethylene is charged into the bomb to 150 p.s.i.g. followed by heating and rocking of the bomb for 1 hour. The bomb is then cooled to below 35° C. and vented to atmospheric pressure. The bomb liner is removed, and the resulting reaction product mixture is analyzed. It is found that 32 percent of the theoretical amount of ethylene has been converted to acetaldehyde in a single pass. The analysis is obtained by vapor phase chromatography. The bomb liner containing the reduced reaction product mixture including some metallic palladium therein is again inserted into the steel bomb, charged with air to 100 p.s.i.g., and heated with agitation for 0.5 hour at 100° C. The cuprous salt is converted to cupric ion, and no Pd(O) is apparent in the resulting reaction product mixture. There is no appreciable loss of product during this regeneration step. Consequently, the reaction product mixture is recharged with ethylene to 150 p.s.i.g. at 148° C. to give a substantially increased yield of acetaldehyde.

Example IV

A 3-liter cylindrical glass bomb liner equipped with a thermowell, a 55/50 standard taper cap, and a small aperture for gas inlet, is charged with 36.32 grams of anhydrous cupric acetate, 9.8 grams of anhydrous potassium acetate, 7.71 grams of ammonium acetate, 2.24 grams of palladium diacetate, 480 grams of glacial acetic acid and 20 grams of water. The glass bomb liner and its contents are inserted into a high pressure cylindrical steel bomb equipped with gas inlet and outlet conduits and a thermocouple port. The bomb and glass liner are then purged with nitrogen at 21° C. with rocking. Ethylene is charged into the bomb to 1000 p.s.i.g.; rocking of the bomb is continued for 1 hour. The bomb is then vented to atmospheric pressure. The bomb liner is removed, and the resulting reaction product mixture analyzed. It is found that 63 percent of the theoretical quantity of ethylene has been converted to acetaldehyde in a single pass. The analysis is made by vapor phase chromatography. The bomb liner containing the reduced reaction product mixture is again inserted into the steel bomb, charged with air to 100 p.s.i.g. and heated with rocking for 0.5 hour at 100° C. The cuprous salt is converted to cupric salt; no Pd(O) is apparent in the resulting reaction product mixture. There is no appreciable loss of product during this regeneration step. Consequently, the reaction product mixture is recharged with ethylene to 1000 p.s.i.g. at 21° C. to give a substantially increased yield of acetaldehyde.

Example V

An 0.3-liter cylindrical glass bomb liner equipped with a 24/40 standard taper cap and a gas inlet aperture is charged with 3.62 grams of anhydrous copper acetate, 1.98 grams of anhydrous potassium acetate, 0.305 gram of palladium acetylcetonate, 48 grams of purified acetonitrile and 2 grams of water. The glass bomb liner and its contents are inserted into a high pressure cylindrical steel bomb equipped with gas inlet and outlet conduits and a thermocouple port. The bomb and glass liner are then purged with nitrogen and heated with agitation to 90° C. under a nitrogen atmosphere. Ethylene is charged into the bomb to 150 p.s.i.g., and heating and rocking of the bomb is continued for 2 hours. The bomb is then cooled to 28° C. and vented to atmospheric pressure. The bomb liner is removed, and the resulting reaction product mixture analyzed. It is found that 60 percent of the theoretical quantity of ethylene has been converted to acetaldehyde in a single pass, as determined by vapor phase chromatography. The bomb liner containing the reduced reaction product mixture including some metallic palladium therein is again inserted into the steel bomb, charged with air to 100 p.s.i.g., and rocked with agitation for 0.5 hour at 100° C. The cuprous salt is converted to cupric ion, and no Pd(O) is apparent in the resulting reaction product mixture. There is no appreciable loss of product during this regeneration step. Consequently, the reaction product mixture is recharged with ethylene to 150 p.s.i.g. at 90° C. to give a substantially increased yield of acetaldehyde.

*Example VI*

An 0.3-liter cylindrical glass bomb liner equipped with a 24/40 standard taper cap and a gas inlet aperture is charged with 5.24 grams of copper acetylacetonate, 1.96 grams of anhydrous potassium acetate, 0.305 gram of palladium acetylacetonate, 48 grams of glacial acetic acid, and 2 grams of water. The glass bomb liner and its contents are inserted into a high pressure cylindrical steel bomb equipped with gas inlet and outlet conduits and a thermocouple port. The bomb and glass liner is then purged with nitrogen and heated with agitation to 90° C. under a nitrogen atmosphere. Ethylene is charged into the bomb to 150 p.s.i.g., and heating and rocking of the bomb is continued for 1 hour. The bomb is then cooled to 28° C. and vented to atmospheric pressure. The bomb liner is removed, and the resulting reaction product mixture analyzed. It is found that 23 percent of the theoretical amount of ethylene has been converted to acetaldehyde, as determined by vapor phase chromatography. The bomb liner containing the reduced reaction product mixture including some metallic palladium therein is again inserted into the steel bomb, charged with air to 100 p.s.i.g., and rocked with agitation for 0.5 hour at 100° C. The cuprous salt is converted to cupric salt, and no Pd(O) is apparent in the resulting reaction product mixture. There is no appreciable loss of product during this regeneration step. Consequently, the reaction product mixture is recharged with ethylene to 150 p.s.i.g. at 90° C. to give a substantially increased yield of acetaldehyde.

*Example VII*

A 1-liter four-neck round-bottom flask fitted with stirrer, water condenser, thermometer, heating mantle and addition funnel is charged with 36.32 grams of anhydrous cupric acetate, 19.62 grams of anhydrous potassium acetate, 2.24 grams of palladium diacetate, 300 grams of purified acetonitrile and 60 grams of water. The mixture is heated until it refluxes gently, then the addition of 82.14 grams of cyclohexene is begun from the addition funnel. Addition is continued during 0.5 hour. A sample removed at this time is analyzed by mass spectroscopy and is found to contain 0.7 mole percent cyclohexanone. The reduced reaction mixture is regenerated by passing air into the hot reaction mixture. The cuprous salt is converted to cupric salt, and no Pd(O) is apparent in the resulting reaction product mixture. There is no appreciable loss of product during this regeneration step. The reaction product mixture shows a substantially increased yield of cyclohexanone after continued heating.

*Example VIII*

An 0.3-liter cylindrical glass bomb liner equipped with a 24/40 standard taper cap and a gas inlet aperture is charged with 3.63 grams of anhydrous cupric acetate, 7.84 grams of anhydrous potassium acetate, 0.224 gram of palladium acetate, 45 grams of glacial acetic acid and 5 grams of water. The glass bomb liner and its contents are inserted into a high pressure cylindrical steel bomb equipped with gas inlet and outlet conduits and a thermocouple port. The bomb and glass liner is then purged with nitrogen and heated with rocking to 100° C. under a nitrogen blanket. Propylene is charged into the bomb to 125 p.s.i.g., and heating and rocking of the bomb is continued for 1 hour. The bomb is then cooled to 30° C. and vented to atmospheric pressure. The bomb liner is removed, and the resulting reaction product mixture is found to contain 0.7 weight percent acetone. The bomb liner containing the reduced reaction product mixture including some metallic palladium therein is again inserted into the steel bomb, charged with air to 100 p.s.i.g., and rocked with agitation for 0.5 hour at 100° C. The cuprous salt is converted to cupric salt, and no Pd(O) is apparent in the resulting product mixture. There is no appreciable loss of product during this regeneration step. Consequently, the reaction product mixture is recharged with propylene to 125 p.s.i.g. at 100° C. to give a substantially increased yield of product.

Though the above relates to various specifics of the present invention, such is not intended as limitations on the present invention except insofar as they appear in the claims.

What is claimed is:

1. A process for the production of carbonyl compounds from the class consisting of aldehydes and ketones, which comprises providing a homogeneous liquid phase mixture of an ethylenically unsaturated hydrocarbon free of acetylenic unsaturation, water, a catalyst, a co-oxidant, and a solvent, wherein
   (a) said mixture contains from about 2 to about 20 weight percent water, basis weight of liquid components of said mixture;
   (b) said catalyst is provided in catalytic amounts and is a metallic compound of the group consisting of metal salts of inorganic acids and organic carboxylic acids which are free of non-benzenoid carbon-to-carbon unsaturation and which have ionization constants not greater than $5 \times 10^{-3}$ in water at 25° C., metal beta-dicarbonyl ketone complexes, metal beta-dicarbonyl ester complexes, and metal beta-ketonitrile complexes, the metal moiety of the foregoing being of the group consisting of palladium, platinum, iridium, rhodium, ruthenium, and gold;
   (c) said co-oxidant is a metallic compound of the group consisting of metal salts of inorganic acids and organic carboxylic acids which are free of non-benzenoid carbon-to-carbon unsaturation and which have ionization constants not greater than $5 \times 10^{-3}$ in water at 25° C., metal beta-dicarbonyl ketone complexes, metal beta-dicarbonyl ester complexes, and metal beta-ketonitrile complexes, the metal moiety of the foregoing being of the group consisting of copper, iron, chromium, cobalt, nickel, moylbdenum, tungsten, manganese, lead, the lanthanides, and mixtures thereof;
   (d) providing sufficient heat to said mixture to form said carbonyl compounds;
   (e) maintaining the mixture during the duration of the formation of said carbonyl compounds essentially free of halide ions and strong acid having an ionization constant greater than $5 \times 10^{-3}$ in water at 25° C.;
   (f) maintaining a titratable base, as determined by titration of said mixture with a measurable amount of perchloric acid in acetic acid, in said mixture during said process;
   (g) said solvent is selected from the group consisting of liquid organic carboxylic acids having an ionization constant not greater than $5 \times 10^{-3}$ in water at 25° C., inert liquid organic compounds, and mixtures thereof; and
   (h) recovering said carbonyl compounds from said mixture.

2. The process of claim 1 wherein the co-oxidant is contacted with oxygen.

3. The process of claim 2 wherein oxygen is provided in the reaction mixture.

4. The process of claim 2 wherein the co-oxidant is periodically regenerated by contact with oxygen after recovery of carbonyl compound from said mixture.

5. The process of claim 1 wherein the ethylenically unsaturated hydrocarbon is gaseous and said mixture is under super atmospheric pressure.

6. The process of claim 1 wherein there is provided in said mixture a basic salt of a monocarboxylic acid having an ionization constant not greater than $5 \times 10^{-3}$ in water at 25° C.

7. The process of claim 6 wherein the basic salt is selected from the group consisting of alkali metal salts and Group II of the Periodic Table metal salts.

8. The process of claim 1 wherein the catalyst is a palladium compound.

9. The process of claim 1 wherein the co-oxidant is a copper compound.

10. The process of claim 8 wherein the co-oxidant is a copper compound and the ethylenically unsaturated hydrocarbon is from the group consisting of ethylene and propylene.

11. The process of claim 10 wherein the ethylenically unsaturated hydrocarbon is ethylene and the solvent is acetic acid.

12. The process of claim 1 wherein the titratable base is the co-oxidant.

References Cited

UNITED STATES PATENTS

| 3,080,425 | 3/1963 | Smidt | 260—597 |
| 3,144,488 | 8/1964 | Smidt | 260—597 |
| 3,076,032 | 1/1963 | Riemenschneider et al. | 260—597 |
| 3,086,994 | 4/1963 | Smidt et al. | 260—597 |

FOREIGN PATENTS

| 884,963 | 12/1961 | Great Britain. |

OTHER REFERENCES

Moiseev et al.: Doklady Acadmii Nauk SSSR 130, 820–823 (1960).

Smidt: Chemistry and Industry, Jan. 13, 1962, pages 54 through 61.

Smidt et al.: Angewandte Chemie 71, 176–182 (1959).

DANIEL D. HORWITZ, *Primary Examiner.*